United States Patent [19]

Okuno et al.

[11] Patent Number: 4,877,308
[45] Date of Patent: Oct. 31, 1989

[54] LIGHT SHIELDING SCREEN STRUCTURE AND A PROCESS FOR PRODUCING THE SAME

[75] Inventors: Osamu Okuno, Chigasaki; Shigeru Sugiyama, Fuji, both of Japan

[73] Assignee: Asahi Kasei Kogyo Kabushiki Kaisha, Osaka, Japan

[21] Appl. No.: 201,467

[22] Filed: Jun. 2, 1988

[30] Foreign Application Priority Data

Jun. 24, 1987 [JP] Japan ................................ 62-155511

[51] Int. Cl.$^4$ .......................................... G02B 27/00
[52] U.S. Cl. .................... 350/276 R; 350/320; 362/354
[58] Field of Search ..... 350/276 R, 276 SL, 320–322, 350/117; 362/29, 30, 255, 256, 351, 353, 354

[56] References Cited

U.S. PATENT DOCUMENTS

| | | | |
|---|---|---|---|
| 2,053,173 | 9/1936 | Astima | 350/276 R |
| 3,102,460 | 9/1963 | Pickett | 362/354 |
| 4,342,821 | 8/1982 | Galves et al. | 350/276 SL |
| 4,506,953 | 3/1985 | Shimizu et al. | 350/276 R |
| 4,688,156 | 8/1987 | Suzuki et al. | 362/354 |
| 4,820,021 | 4/1989 | Usubuchi et al. | 350/276 R |

FOREIGN PATENT DOCUMENTS

| | | |
|---|---|---|
| 55-7562 | 2/1980 | Japan . |
| 55-139250 | 10/1980 | Japan . |
| 57-89701 | 4/1982 | Japan . |
| 57-165802 | 10/1982 | Japan . |
| 58-174945 | 10/1983 | Japan . |
| 58-215880 | 12/1983 | Japan . |
| 60-70312 | 4/1985 | Japan . |
| 60-125880 | 7/1985 | Japan . |
| 60-168103 | 8/1985 | Japan . |
| 60-175002 | 9/1985 | Japan . |
| 60-195849 | 10/1985 | Japan . |
| 62-9201 | 1/1987 | Japan . |

*Primary Examiner*—L. T. Hix
*Assistant Examiner*—D. Rutledge
*Attorney, Agent, or Firm*—Birch, Stewart, Kolasch & Birch

[57] ABSTRACT

A light shielding screen structure comprising a first light transmissible substrate, a second light transmissible substrate and, interposed therebetween, a light shielding screen comprising a perforated structure comprising a plurality of fine partition walls and apertures defined by said partition walls, said first and second light transmissible substrates being connected respectively to both end surfaces of the parition walls of the light shielding screen through a photocured adhesive layer. The screen structure exhibits a peeling strength of 50 g/cm or more at the connection between each partition wall and each light transmissible substrate and includes a fillet of not greater than 5 μm in width in each aperture at a corner portion defined by the inner wall of each aperture and the inner surface of each light transmissible substrate. The light shielding screen structure exhibits not only excellent mechanical strength but also excellent optical properties and is advantageously used in various indicators and image indicating devices.

10 Claims, 4 Drawing Sheets

LIGHT SHIELDING SCREEN STRUCTURE AND A PROCESS FOR PRODUCING THE SAME

BACKGROUND OF THE INVENTION

1. Field Of The Invention

The present invention relates to a light shielding screen structure. More particularly the present invention is concerned with a light shielding screen structure having not only a high mechanical strength but also excellent optical properties, which is useful for adjusting the angles of the light rays emitted from various indicators such as indicators for instruments mounted on an instrument panel of an automobile and from image-indicating devices such as the CRT (cathode-ray tube) of a television receiver and for shielding extraneous light rays incident on the indicators or image-indicating devices, thereby preventing the deterioration of an image projected.

2. Discussion Of Related Art

Various light shielding screens have heretofore been proposed. For example, Japanese Patent Application Publication No. 55-7562/1980 and U.S. Pat. No. 2,053,173 disclose a light shielding screen which is produced by a process which comprises putting transparent plastic layers and light shielding plastic layers one upon another to form a block consisting of laminated layers and slicing the resulting block perpendicularly relative to the laminated layers.

However, in the above-mentioned conventional light shielding screen, it is difficult to precisely control the width and the thickness of the transparent layer and the light shielding layer, since in slicing the block to form a light shielding screen the transparent layer and the light shielding layer undergo deformation. Further, the process necessarily involves the step of smoothing the surface exposed by slicing. Therefore, such a light shielding screen cannot be stably produced.

On the other hand, a light shielding screen having a fine structure produced from a photocurable resin composition has been proposed in Japanese Patent Application Laid-Open Specification No. 55-139250/1980. However, in the light shielding screen disclosed in the above-mentioned patent application laid-open specification, the fine partition walls are exposed. Therefore, the light shielding screen has disadvantages in that when it is actually used for various applications, there is the disadvantage that the exposed fine structure suffers physical damage upon contact with other objects, and that foreign matter such as dust etc. may accumulate in the spaces between the partition walls, thereby decreasing the light transmission.

In order to obviate the above-mentioned disadvantages, Japanese Patent Application Laid-Open Specification Nos. 57-89701, 57-165802, 58-215880 and 60-125880 and U.S. Pat. No. 4,688,156 have proposed to fill the spaces between the partition walls with a transparent resin or attach a transparent sheet to the ends of the partition walls by means of an adhesive or a double-coated adhesive tape so as to cover up the fine partition wall structure. However, in the case where the spaces are filled with a transparent resin, it is difficult to fill up the spaces between the partition walls with the transparent resin without causing bubbles to form therein. On the other hand, in the case of attaching a transparent sheet by means of an adhesive or a double-coated adhesive tape, if the amount of the adhesive used is not enough, the bonding strength between the transparent sheet and the ends of the partition walls is too low, whereas if the amount of the adhesive is in excess, the adhesive is likely to enter the spaces between the partition walls to such a degree that transmitted light rays are scattered, resulting in a decrease in light transmission. Thus, heretofore there has not been realized a light shielding screen structure satisfying both the requirements of satisfactory bond strength and excellent optical properties.

Japanese Utility Patent Application Laid-Open Specification No. 62-9201 discloses a light shielding screen structure comprising a first light transmissible substrate having a light shielding layer thereon, and a second light transmissible substrate connected to the first light transmissible substrate through the light shielding layer. The light shielding layer comprises at least one light shielding screen portion and a light non-transmissible retaining portion which includes the entire outermost peripheral area of the light shielding layer. The second light transmissible substrate is attached to the light shielding layer at only its light non-transmissible retaining portion by means of a double-coated adhesive tape. However, in preparing this light shielding screen structure, since it is necessary to provide an adhesive tape having a shape corresponding to the shape of the light shielding screen portion, the types of light shielding screen structures which may be used are limited. Further, this type of light shielding screen structure is also disadvantageous in that since there is no bonding between the light shielding screen portion of the light shielding layer and the second light transmissible substrate, when it is intended to produce a light shielding screen structure in which the light shielding screen portion has a large area relative to the light non-transmissible retaining portion, the bonding strength between the light shielding layer and the second light transmissible substrate becomes too weak, and there cannot be obtained a light shielding screen structure having a sufficient mechanical strength as a whole.

SUMMARY OF THE INVENTION

The present inventors have made extensive and intensive studies with a view toward eliminating the above-mentioned drawbacks of the conventional light shielding screen structures. As a result, they have found that when in a light shielding screen structure comprising first and second light transmissible substrates and a light shielding screen composed of partition walls and interposed between the first and second substrates, the upper and lower end surfaces of the partition walls are bonded respectively to the first and second substrates by means of a photo curable adhesive, the light shielding screen structure is advantageous in that it not only has a high mechanical strength but also has excellent optical properties. Based on these findings, the present invention has been completed.

According to the present invention, there is provided a light shielding screen structure comprising:
a first light transmissible substrate;
a second light transmissible substrate; and
a light shielding screen interposed between
said first light transmissible substrate and
said second light transmissible substrate,
said light shielding screen comprising a photocured resin composition layer and a plurality of apertures passing through said resin composition layer, said apertures in said resin composition layer forming a perforated structure of a striped or sectioned pattern, in which said resin composition layer constitutes partition walls defining said apertures, said apertures having their respective upper and lower openings respectively defined by the upper and lower ends of said partition walls, the upper and lower end surfaces of said partition walls being connected respectively to said first light transmissible substrate and said second light transmissible substrate through a photocured adhesive layer, with part of the photocured adhesive layer which protrudes outwardly from the areas of the upper and lower end surfaces of said partition walls forming a fillet in each aperture at a corner portion which is defined by the inner wall of each aperture and the inner surface of each light transmissible substrate, the connection between each partition wall and each light transmissible substrate having a peeling strength of 50 g/cm or more, and said fillet having a width of not greater than 5 μm.

Accordingly, it is an object of the present invention to provide a light shielding screen structure which not only has excellent optical properties but also excellent mechanical strength.

It is another object of the present invention to provide a light shielding screen structure of the above kind, which is simple in structure.

It is a further object of the present invention to provide a method for producing a light shielding screen structure of the character described above, which can be easily conducted through photocuring a photocurable adhesive.

The foregoing and other objects, features and advantages of the present invention will be apparent to those skilled in the art from the following description and appended claims in connection with the accompanying drawings.

BRIEF DESCRIPTION OF DRAWINGS

In the drawings:

In FIGS. 1 through 6(b), like parts or portions are designated by like numerals or characters.

Referring now to FIGS. 1 to 3, numeral 2a designates a first light transmissible substrate, numeral 7a an adhesive layer, numeral 1 a light shielding screen, numeral 7b an adhesive layer and numeral 2b a second light transmissible substrate. Light shielding screen 1 comprises a photocured resin composition layer and a plurality of apertures passing through the photocured resin composition layer in a direction perpendicular to the layer surface of the resin composition layer. The photocured resin composition layer cooperates with the apertures to form a perforated structure of a predetermined pattern, in which the photocured resin composition layer constitutes partition walls defining the apertures. As shown in FIG. 2, in one embodiment of the present invention, a plurality of partition walls 1A are arranged in a regular square network pattern. The apertures have their respective upper and lower openings respectively defined by the upper and lower ends of partition walls 1A. As shown in FIG. 1, the upper and lower end surfaces of partition walls 1A are connected respectively to first light transmissible substrate 2a and second light transmissible substrate 2b through photocured adhesive layer 7a, 7b.

In FIG. 4, there is shown an enlarged view illustrating how a fillet is formed. As is seen from FIG. 4, part of photocured adhesive layer 7a, 7b protrudes outwardly from the areas of the upper and lower end surfaces of the partition walls 1A to form fillet 8 in each aperture at its corner portion defined by the inner wall of each aperture and the inner surface of each light transmissible substrate 2a, 2b. The width of fillet 8 is herein defined by the length of W as depicted in FIG. 4.

Figure 1:
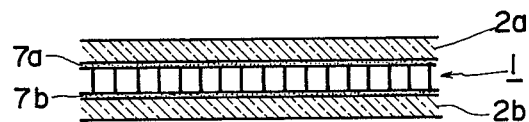
FIG. 1 shows a schematic side view of one form of a light shielding screen structure according to the present invention.
Figure 2:
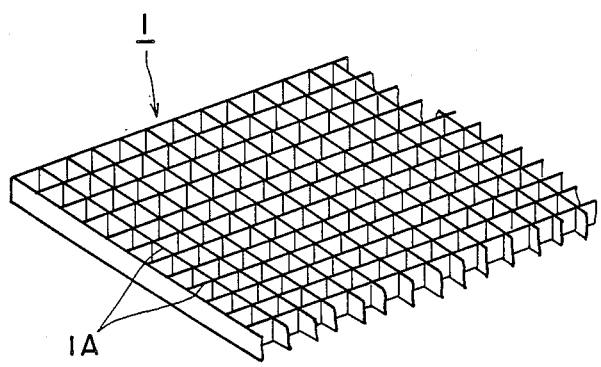
FIG. 2 shows a schematic perspective view of one form of a light shielding screen to be used in the present invention.
Figure 3:
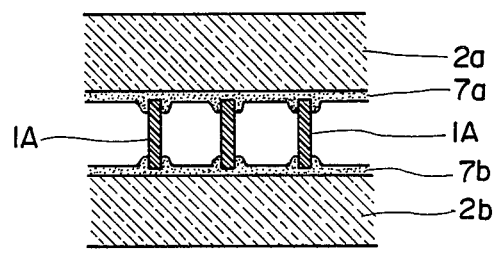
FIG. 3 is a partly cut-away enlarged view of FIG. 1.

In the light shielding screen structure of the present invention, due to the connection of light transmissible substrate 2a, 2b to the end surface of partition wall 1A through photocured adhesive layer 7a, 7b, protrusion of the adhesive layer into each aperture defined by the partition walls is suppressed and, accordingly, the size of fillet 8 can be minimized, while maintaining the bonding strength between light transmissible substrate 2a, 2b and partition wall 1A at a practical level. As a result, in the present light shielding screen structure, the viewable angle and haze can be controlled. Further, the light shielding screen structure of the present invention does not suffer from peeling, not only when it is subjected to blanking or cutting but also when it is fixed on an indicator, an image-indicating device and the like. In addition, because a photocurable adhesive is used, the time for completion of bonding in the process for the production of a light shielding screen structure is shortened.

As described above, light shielding screen 1 to be used in the present invention comprises a plurality of partition walls 1A made of a photocured resin composition and apertures defined thereby. Such a light shielding screen is prepared by a process comprising superimposing a negative mask having a predetermined pattern on a photocurable resin composition layer, irradiating the resin composition with active rays through the mask so as to photocure the photocurable resin so that it corresponds with the pattern, and removing the uncured resin with a developer. The height of the partition wall is equal to the thickness of light shielding screen 1, which thickness depends on the thickness of the photocurable resin composition layer The light shielding screen to be used in the present invention has a striped pattern or a sectioned pattern. Examples of sectioned patterns include various patterns such as a circle network pattern, an ellipse network pattern, a triangle network pattern, a regular square network pattern, a rectangle network pattern, a rhombic network pattern, a parallelogram network pattern and honeycomb pattern, etc. The partition wall structure may constitute the entire part of the light shielding screen or may be locally present in the light shielding screen. In the case of the latter, the partition wall structure portion may represent a design such as a circle, a polygon, a silhouette, etc., and the remaining portion of the light shielding screen layer may constitute a light non-transmissible portion having the same thickness as that of the partition wall structure portion.

The width of an aperture defined by the partition walls may vary depending on the shape of the aperture. However, in general, if the width of the aperture is too small, the formation of partition walls becomes difficult while if the width is too large, the angle of transmitted light becomes too large, which is undesirable from a practical viewpoint. Thus, the width of the aperture is preferably in the range of from 20 to 500 $\mu$m. (The term "width of an aperture" as used herein is intended to mean: the inner distance between the adjacent stripes in the case of a striped pattern; the inner diameter in the case of a circular aperture; the length of the inner minor axis in the case of an oval aperture; in the case of a polygonal aperture having sides in odd numbers, the minimum inner distance between the vertexes and the sides opposite to the vertexes; and in the case of a polygonal aperture having sides in even numbers, the minimum inner distance between the opposite sides.) Likewise, if the height of the partition wall is too large, the formation of partition walls becomes difficult while if it is too small, the angle of transmitted light becomes too large. Therefore, the height of the partition wall is preferably in the range of from 50 to 1,000 $\mu$m. With respect to the thickness of the partition wall, if it is too small, the formation of the partition walls becomes difficult while if it is too large, the light transmission is lowered. The thickness is preferably in the range of from 5 to 500 $\mu$m, more preferably in the range of from 10 to 200 $\mu$m. In addition, if the ratio of the thickness of the partition wall to the width of the aperture is too large, the angle of the transmitted light becomes too large, while if it is too small, the formation of the partition walls becomes difficult. The ratio of the thickness of the partition wall to the width of the aperture is preferably in the range of from 1/1 to 1/10. On the other hand, if the ratio of the width of the aperture to the height of the partition wall is too large, the angle of transmitted light becomes too large, while if it is too small, the formation of the partition walls becomes difficult. The ratio of the width of the aperture to the height of the partition wall is preferably in the range of from 1/0.5 to 1/5.

The size of the light shielding screen structure of the present invention may vary depending on the applications, but in general, it is not smaller than a 5 mm×5 mm size. If desired, a light shielding screen structure having a great size may first be obtained, and light shielding screen structures of smaller sizes may be cut out therefrom.

In the method for producing a light shielding screen structure of the present invention, the preparation of a light shielding screen is involved. As described later, a light shielding screen may be provided in a composite form for the subsequent steps, in which composite form the light shielding screen is attached to a light transmissible substrate, or it may be prepared in a single form for the subsequent steps.

For preparing a light shielding screen in a composite form as mentioned above, there is used a method comprising: applying a photocurable resin composition in a predetermined thickness to the surface of a light transmissible substrate or laminating a sheet of a photocurable resin composition on the surface of a light transmissible substrate to obtain an assembly, the light transmissible substrate having previously been coated with a photocurable adhesive which is capable of bonding the light transmissible substrate to the photo curable resin composition when photocured; placing a negative having a predetermined pattern on the assembly; exposing the resultant assembly to active rays from a source such as an arc lamp, a mercury vapor lamp, a xenon lamp, an ultraviolet ray fluorescent lamp or the sun to cure the photocurable resin composition in accordance with the pattern of the negative and simultaneously cure the photocurable adhesive; removing the negative; and removing the non-exposed portion of the photocured resin by means of a developer to effect development, so that the desired reliefs are obtained. The above-mentioned photocurable adhesive may preferably comprise, for example, a polymer disclosed in Japanese Patent Application Laid-Open Specification No. 58-174945/1983, which has been three-dimensionally polymerized by an ionic addition reaction and has terminal ethylenically unsaturated bonds in the molecule.

In the photocuring process of the resin composition, it is preferred that the surface portions of both the ends of the resultant relief (i.e., the end surfaces of the partition walls) still contain a photocurable resin composition remaining less cured. In this connection, the following should be noted. As described later when referring to FIGS. 5(a) to 5(g), in preparing a light shielding screen, areas on the surface of the photocurable resin composition layer which correspond to the end surfaces of the partition walls are in contact with a release film when pattern forming exposure is conducted. Since such a release film generally has oxygen permeability, the areas corresponding to the end surfaces of the partition walls are caused to be contacted with oxygen. In the presence of oxygen, the radicals produced by the exposure are likely to undergo termination of the reaction and thus the photocuring reaction no longer proceeds at the end surfaces of the partition wall, whereas the inner portions of the partition walls are completely photocured. From a viewpoint of oxygen permeability, it is preferred that the release film to be interposed between the negative film and the photocurable resin composition layer (see FIGS. 5(a) to 5(g)) is made of polypropylene, cellulose ester, polycarbonate, polymethyl methacrylate, polyethylene, polystyrene, polyethylene terephthalate or the like and that the thickness of the release film is 3 $\mu$m to 50 $\mu$m.

In order for the photocurable resin composition to surely remain less cured at portions corresponding to the end surfaces of the partition walls, a post-exposure operation is preferably omitted or conducted with active rays as weak as 500 mJ/cm$^2$ or less, which post-exposure operation is usually conducted in preparing a conventional light shielding screen after the pattern forming exposure and subsequent development in order to increase the strength of the partition walls. Alternatively, there may be employed a photocurable resin composition having photocuring properties lowered by incorporating a dye or a pigment. There may also preferably be employed a photocurable resin composition which contains a prepolymer having unsaturated bonds in the main chain. In these ways, less photocuring of the photocurable resin composition at portions corresponding to the upper and lower end surfaces of the partition walls can be attained.

For preparing a light shielding screen having partition walls with improved light shielding properties, a light shielding screen is dyed or it is prepared using a photocurable resin composition having incorporated therein a dye or a pigment. In the latter case, it is necessary that a dye or a pigment be incorporated in such an amount that the photosensitivity of the photocurable resin composition is not remarkably decreased. The amount of a dye or a pigment to be added is from 0.05 to 2.0 wt%, preferably from 0.1 to 1.0 wt%. Examples of dyes to be used in the present invention include cationic dyes, disperse dyes, reactive dyes, acid dyes, direct dyes and metallized dyes. Particularly, a disperse dye or a metallized dye is preferable from the viewpoint of weathering-resistant properties. The type of dye to be used may be chosen from the viewpoints of the compatibility of the dye with the photocurable resin composition and the absorption characteristics of the dye. With respect to the pigment to be used in the present invention, either an inorganic pigment or an organic pigment can be employed, and it is preferable to employ a pigment having good dispersibility.

In FIG. 5(a) to 5(g), there is schematically illustrated one mode of a process for producing the light shielding screen structure of the present invention, in which a light shielding screen is first prepared in composite form as in Example 1 which is described later.

Figure 5A:
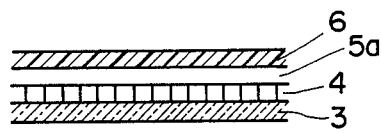
FIGS. 5(a) to 5(g) are schematic views explaining one mode of a process for producing a light shielding screen structure according to the present invention, in which process a light shielding screen is provided in a composite form in which the light shielding screen is attached to a light transmissible substrate by means of a photocured adhesive; an FIGS. 6(a) and 6(b) are schematic views explaining another mode of a process for preparing a light shielding screen structure according to the present invention, in which process a light shielding screen is provided in a single form.
Figure 5B:
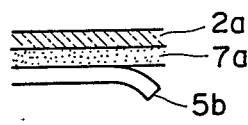
Figure 5C:
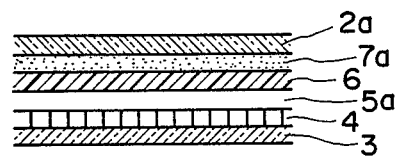
Figure 5D:
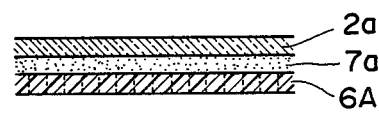
Figure 5E:
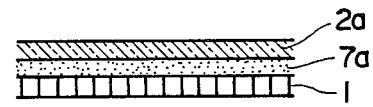
Figure 5F:
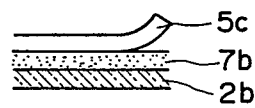
Figure 5G:
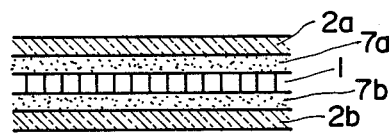

As shown in FIG. 5(a), on transparent glass plate 3 are superimposed image-bearing negative 4, release film 5a which is made of a polypropylene film, and photocurable resin composition layer 6 in this order to obtain a photocurable resin assembly. As shown in FIG. 5(b), a separately-prepared laminate of light transmissible substrate 2a made of polyethylene terephthalate, photocurable adhesive layer 7a and release film 5b made of a polypropylene film is provided. Release film 5b is peeled off from the laminate. The laminate with release film 5b peeled off therefrom is placed on the photocurable resin assembly so that adhesive layer 7a and photocurable resin composition layer 6 are contacted with each other [see FIG. 5(c)]. Then, the resultant assembly is exposed from the side of transparent glass plate 3 to active rays to effect photocuring of not only photocurable resin composition layer 6 but also photocurable adhesive layer 7a. In this instance, as described before, it is preferred that the photocuring is conducted in such a manner that the photocurable resin composition remains less cured at portions corresponding to the end surfaces of the ultimate partition walls. Then, release film 5a is peeled off and the non-exposed (non-photocured) areas of resin layer 6A are removed for the development of partition walls, followed by dying the partition walls, thereby obtaining light shielding screen 1 in a composite form in which partition walls are connected at their respective ends to light transmissible substrate 2a through photocured adhesive layer 7a [see FIG. 5(d) and 5(e)]. Thereafter, release film 5c is peeled off from a laminate of photocurable adhesive 7b and light transmissible substrate 2b. On the laminate with release film 5c peeled off therefrom is placed the above-prepared light shielding screen 1 with light transmissible substrate 2a connected thereto in such a manner that adhesive layer 7b is contacted with the end surfaces of the partition walls of light shielding screen 1 [see FIG. 5(f) and 5(g)], and both of them are pressed to each other. Finally, the resultant laminate assembly is exposed from the side of light transmissible substrate 2b to active rays to bond the end surfaces of the partition walls to light transmissible substrate 2b by means of photocured adhesive 7b, thereby obtaining a light shielding screen structure of the present invention.

In the above process, the photocuring of photocurable adhesive layer 7a for connecting the upper ends of partition walls to upper light transmissible substrate 2a is effected simultaneously with formation of partition walls by the pattern-wise photo curing of the photocurable resin composition layer 6. Therefore, there is no danger that photocured adhesive 7a protrudes into the apertures between the partition walls of light shielding screen 1.

In the above process, it should further be noted that the the photocurable resin composition remains less cured at portions corresponding to the end surfaces of the ultimate partition walls due to the polymerization inhibiting effect of oxgen as described above. As photocurable adhesive 7a and 7b, there is preferably employed such a polymer as is disclosed in Japanese Patent Application Laid-open Specification No. 58-174945, which polymer has been three-dimensionally polymerized by ionic addition reaction and has terminal ethylenically unsaturated bonds in the molecule. When exposed to active rays, the photocurable resin composition remaining less cured in the end surfaces of the partition walls and the lower adhesive layer 7b are caused to be chemically bonded together. Therefore, although photocurable adhesive layer 7b is solid and very thin, strong bonding with the end surfaces of the partition walls can be obtained. The decreased thickness of the adhesive layer and the solid state of the adhesive layer contributes to preventing the adhesive from protrusion into the apertures so that the size of a fillet is reduced, while attaining strong bonding between the end surfaces of the partition walls and lower light transmissible substrate 2b through the photocured adhesive layer 7b.

In another mode in which a light shielding screen is produced in a single form, substantially the same procedure is conducted as in the production of a light shielding screen in a composite form, except that a photocurable adhesive is not applied to the light transmissible substrate and the transparent substrate is removed after the pattern forming exposure, as described in Japanese Patent Application Laid-Open Specification No. 60-195849/1985.

In this mode, after the photocurable resin composition layer has been subjected to pattern forming exposure, the non-exposed areas of the photocured resin composition layer are removed, thereby obtaining a light shielding screen in a single form in which the photocurable resin composition remains less cured on both the upper and lower end portions of the partition walls. Since a photocured resin composition is not bonded to the light transmissible substrate by means of a photocured adhesive, as different from the previously-mentioned mode, removal of the non-exposed areas can be easily performed as compared to the case of a photocured resin composition layer having a light transmissible substrate bonded thereto. Therefore, this mode of a process in which a light shielding screen is produced in a single form, is suitable for the production of a light shielding screen structure of the type in which partition walls having large heights are desired.

Figure 6A:
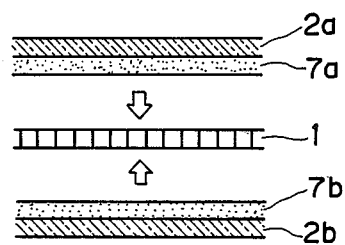
Figure 6B:
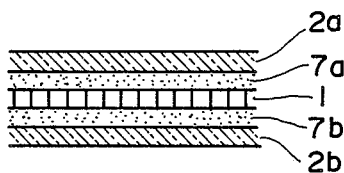

Referring to FIG. 6(a), numeral 1 designates a light shielding screen produced in a single form as mentioned above. Light shielding screen 1 is interposed between light transmissible substrate 2a coated with photocurable adhesive 7a and light transmissible substrate 2b coated with photocurable adhesive 7b as depicted in FIG. 6(a). The resultant laminate assembly is exposed from the sides of light transmissible substrates 2a and 2b to active rays. By exposure to active rays, transmissible substrates 2a and 2b are firmly bonded to light shielding screen 1 at the end surfaces of the partition walls through photocured adhesive layers 7a and 7b, respectively. Thus, a light shielding screen structure of the present invention in which the formation of a fillet, constituted of the adhesive, is restrained while attaining strong bonding between the light transmissible substrates and the light shielding screen, is obtained.

Accordingly, in another aspect of the present invention, there is provided a process for producing a light shielding screen structure comprising:

(a) providing a light shielding screen comprising a perforated structure comprising a plurality of partition walls and apertures defined by said partition walls, said partition walls being arranged to form the apertures in a striped or sectioned pattern, said light shielding screen being in a composite form in which said light shielding screen is connected at one end surface of each partition wall to a first light transmissible substrate through a photocured adhesive layer or being in a single form;

(b) in the case of the light shielding screen in a single form, pressing a first light transmissible substrate having a photocurable adhesive layer and a second light transmissible substrate having a photocurable adhesive layer respectively against both sides of said light shielding screen to obtain a laminate assembly, or in the case of the light shielding screen in a composite form, pressing said light shielding screen against a second light transmissible substrate having a photocurable adhesive layer on its side of the photocurable adhesive layer to obtain a laminate assembly; and (c) exposing the laminate assembly to active rays to cure the photocurable adhesive layer, thereby enabling the connection between each partition wall and each light transmissible substrate to have a peeling strength of 50 g/cm or more and providing a fillet having a width of 5 μm or less, said fillet being defined as part of the photocured adhesive layer which protrudes outwardly from the areas of the upper and lower end surfaces of said partition walls in each aperture at a corner portion defined by the inner wall of each aperture and the inner surface of each light transmissible substrate.

A preferred example of a photocurable resin composition to be used in the present invention is a composition comprising a prepolymer having polymerizable ethylenically unsaturated groups, and, if desired, an ethylenically unsaturated monomer, a photosensitizer and a thermal polymerization inhibitor. Examples of prepolymers include unsaturated polyesters, unsaturated polyurethanes, oligomers of an ester-acrylate type, unsaturated polyamides, unsaturated polyimides, unsaturated polyethers and unsaturated poly(meth)acrylates, various modified products thereof such as alkyd resins and various rubber compounds having carbon-carbon double bonds. Prepolymers having a number average molecular weight of about 500 or more, usually about 500 to about 100,000 as measured by osmometry, are generally employed.

Representative examples of unsaturated polyesters and modified unsaturated polyesters include polyesters prepared by reacting unsaturated dibasic acids such as maleic acid, fumaric acid and itaconic acid or anhydrides thereof with polyvalent alcohols such as ethylene glycol, propylene glycol, diethylene glycol, triethylene glycol, glycerin, trimethylol propane, pentaerythritol, 1,4-polybutadiene having a terminal hydroxyl group, hydrogenated or non-hydrogenated 1,2-polybutadiene, butadienestyrene copolymer and butadiene-acrylonitrile copolymer; polyesters obtained by substituting a portion of the acid components of the abovementioned unsaturated polyesters with saturated polybasic acids such as succinic acid, adipic acid, phthalic acid, isophthalic acid, phthalic anhydride and trimellitic acid; and alkyd resins obtained by modifying the above-mentioned polyesters with a drying oil fatty acid or semidrying oil fatty acid.

Examples of unsaturated polyurethanes include unsaturated polyurethanes having addition-polymerizable unsaturated groups introduced by utilizing terminal isocyanate and/or hydroxyl groups of polyurethanes derived from at least one polyol having two or more terminal hydroxyl groups and at least one polyisocyanate, for example, unsaturated polyurethanes which are prepared from (i) a polyurethane having terminal isocyanate and/or hydroxyl groups and prepared from at least one polyol such as a polyhydric alcohol as mentioned above, polyester polyol or polyether polyol and at least one polyisocyanate such as tolylene diisocyanate, diphenylmethane-4,4'-diisocyanate or hexamethylene diisocyanate and (ii) at least one unsaturated mono- or dicarboxylic acid as mentioned above or its ester or polyester having active hydrogen atoms derived from hydroxyl (reactive with the terminal isocyanate) and/or carboxyl (reactive with both of the terminal isocyanate and the terminal hydroxyl) and/or amino groups (reactive with the terminal isocyanate), and unsaturated polyurethanes obtained by linking two or more molecules of an unsaturated polyester as mentioned above with a polyisocyanate.

Examples of oligomers of an ester-acrylate type include oligomers obtained by the co-condensation of an esterification reaction system composed of a polycarboxylic acid or its anhydride and a polyhydric alcohol with acrylic acid and/or methacrylic acid. The oligomers have a number average molecular weight of about 500 to about 5,000. The number average molecular weight can be controlled by choosing an appropriate molar ratio of the raw materials. Examples of polycarboxylic acids or anhydrides thereof include adipic acid, isophthalic acid, phthalic acid and phthalic anhydride. Examples of polyhydric alcohols include ethylene glycol, propylene glycol, diethylene glycol, triethylene glycol, glycerin, trimethylolpropane and pentaerythritol. Examples of oligomers of an ester-acrylate type also include epoxyacrylates, for example, esters of acrylic acid or methacrylic acid and a compound having epoxy groups obtained by condensation polymerization of a polyhydric alcohol or polyhydric phenol with epichlorohydrin or an alkylene oxide and also include polymers having, in its side chains, carbon-carbon double bonds capable of taking an active part in the addition polymerization reaction, for example, polymers obtained by reacting an unsaturated carboxylic acid or its anhydride with a polymer having hydroxyl groups such as polyvinyl alcohol or cellulose, polymers obtained by esterifying a homopolymer or copolymer of acrylic acid or methacrylic acid having carboxyl groups with an unsaturated alcohol such as allyl alcohol, glycidyl acrylate or glycidyl methacrylate, polymers obtained by reacting a copolymer containing maleic anhydride monomer units with allyl alcohol, a hydroxyalkyl acrylate and/or a hydroxyalkyl methacrylate, and polymers obtained by reacting a copolymer having glycidyl acrylate and/or glycidyl methacrylate monomer units with acrylic acid and/or methacrylic acid.

Suitable examples of rubbers having carbon-carbon double bonds include a member (I) selected from the group consisting of 1,4-polybutadiene, 1,2-polybutadiene, a copolymer of butadiene and styrene, a copolymer of butadiene and acrylonitrile and an EPDM; a member (II) selected from the group consisting of a polymer obtained by hydrogenating the member (I), a copolymer of isobutylene and isoprene and a copolymer of ethylene and propylene; and a modified rubber having an ethylenically unsaturated group which may be obtained by introducing an ethylenically unsaturated group into the above-mentioned member (I) and member (II).

As stated above, the member (I) per se and the modified rubber obtained by introducing an ethylenically unsaturated group into the member (I) may suitably be employed in the present invention. With respect to the modified rubber, introduction of an ethylenically unsaturated group into the member (I) may be effectively carried out by using a rubber of varied kind having a functional group at its chain terminal. On the other hand, in the case of a rubber having a 1,2-polybutadiene segment, introduction of an ethylenically unsaturated group thereinto may readily be effected by utilizing an addition reaction of maleic anhydride or the like to the 1,2-polybutadiene segment.

As the ethylenically unsaturated monomer which may be used in the photocurable resin composition, there may be mentioned commonly known ethylenically unsaturated monomers a follows:

(1) unsaturated carboxylic acids such as acrylic acid and methacrylic acid, or esters thereof, for example, alkyl acrylate, alkyl methacrylate, cycloalkyl acrylate, cycloalkyl methacrylate, alkyl halide acrylate, alkyl halide methacrylate, alcoxyalkyl acrylate, alcoxyalkyl methacrylate, hydroxyalkyl acrylate, hydroxyalkyl methacrylate, aminoalkyl acrylate, aminoalkyl methacrylate, tetrahydrofurfuryl acrylate, tetrahydrofurfuryl methacrylate, allyl acrylate, allyl methacrylate, glycidyl acrylate, glycidyl methacrylate, benzyl acrylate, benzyl methacrylate, phenoxy acrylate, phenoxy methacylate, mono- or di-acrylate of alkylene glycol, mono- or di-methacrylate of alkylene glycol, mono- or diacrylate of polyoxyalkylene glycol, mono- or dimethacrylate of polyoxyalkylene glycol, trimethylolpropane triacrylate, trimethylolpropane trimethacrylate, pentaerythritol tetraacrylate, and pentaerythritol tetramethacrylate;

(2) acrylamides and methacrylamides, or derivatives thereof, for example, an acrylamide N-substituted with an alkyl or hydroxyalkyl group, a methacrylamide N-substituted with an alkyl or hydroxyalkyl group, an acrylamide N,N'-disubstituted with alkyl and/or hydroxyalkyl groups, a methacrylamide N,N'-disubstituted with alkyl and/or hydroxyalkyl groups, diacetone acrylamide, diacetone methacrylamide, N,N'-alkylene-bis-acrylamide, and N,N'-alkylene-bismethacrylamide;

(3) allyl compounds such as allyl alcohol, allyl isocyanate, diallyl phthalate and triallyl cyanurate;

(4) maleic acid, maleic anhydride and fumaric acid, and esters thereof, for example, mono- or di-alkyl maleate, mono- or di-alkyl fumarate, mono- or dihaloalkyl maleate, mono- or di-haloalkyl fumarate, mono- or dialkoxyalkyl maleate, and mono- or dialkoxyalkyl fumarate; and (5) other unsaturated compounds such as styrene, vinyltoluene, divinylbenzene, N-vinylcarbazole and N-vinyl-pyrrolidone. They may be used either alone or in combination. When they are employed in combination, an azide compound may be incorporated into the ethylenically unsaturated monomers. As such an azide compound, there may be mentioned 4,4'-diazidostilbene, p-phenylenebisazide, 4,4'-diazidobenzophenone, 4,4'-diazidophenylmethane, 4,4'-diazidochalcone, 2,6-di(4'-azidobenzal)-cyclohexanone, 4,4'-diazidostilbene-α-carboxylic acid, 4,4'-diazidodiphenyl, disodium salt of 4,4'-diazidostilbene-2,2'-disulfonic acid and the like. The amount of the ethylenically unsaturated monomer which may be optionally incorporated into the above-mentioned prepolymer may usually be 200 parts or less by weight per 100 parts by weight of the prepolymer.

Various photopolymerization sensitizers as commonly used can be added to the photocurable resin composition to be employed in the present invention. Specific examples of such sensitizers include benzoin, benzoin alkyl ethers such as benzoin ethyl ether, benzoin n-propyl ether, benzoin isopropyl ether and benzoin isobutyl ether, 2,2-dimethoxy-2-phenylacetophenone, benzophenone, benzyl, diacetyl, diphenyl sulfide, eosin, thionine, 9,10-anthraquinone, 2-ethyl-9,10-anthraquinone, Michler's ketone and the like. They may be used either alone or in combination. The amount of any photopolymerization initiator is such as will be effective for polymerization, i.e., 0.001 to 10% by weight based on the photocurable resin composition.

As the heat-polymerization inhibitor optionally added to the photocurable resin composition to be employed in the present invention, there may be mentioned, for example, hydroquinone, tert-butylhydroquinone, benzoquinone, 2,5-diphenyl-p-benzoquinone, picric acid, di-p-fluorophenyl-amine, p-methoxyphenol, 2,6-di-tert-butyl-p-cresol and the like. They may be used either alone or in combination. The heat-polymerization inhibitors are added for preventing heat-polymerization reactions (reactions in the darkness). Accordingly, the amount of any heat-polymerization inhibitor is such a will be effective for inhibiting heat-polymerization, i.e., 0.005 to 5.0% by weight based on the prepolymer or the total weight of the prepolymer and the ethylenically unsaturated monomer. Photocurable compositions other than those mentioned above, for example, a composition comprising polyethylene, polythiol and a photopolymerization initiator as disclosed in Japanese Patent Application Publication No. 46-9525/1971 may also be employed in the present invention.

In the present invention, roughening of the partition walls of the light shielding screen is effective for decreasing the reflectance of light rays from the partition walls and, therefore effective in preventing the ghost phenomenon and light leakage. The above-mentioned roughening of the partition walls may be advantageously attained by adding a delustering agent to the photocurable resin composition.

Examples of delustering agents to be employed in the present invention include titanium oxide, mica, calcium carbonate, a powdered glass such as Glass Pearl having a particle diameter of 5 to 15 μm (trade name of a product manufactured and sold by Kyoritsu Ceramics Co., Ltd., Japan), a finely divided silica such as Syloid having a particle diameter of 0.5 to 20 μm (trade name of a product manufactured and sold by Fuji Davison Chemical Co., Ltd., Japan) and Aerosil having a particle diameter of 0.5 to 20 μm (trade name of a product manufactured and sold by Nippon Aerosil Co., Ltd., Japan), aluminum powder, a powdered clay and the like. The amount of the delustering agent to be added to the photocurable resin composition in the present invention may generally be in the range of from 0.1 to 20% by weight, preferably from 0.5 to 10% by weight based on the photocurable resin composition. In general, in case the amount of the delustering agent is less than 0.1% by weight based on the photocurable resin composition, an effect for reflecting extraneous light rays is not sufficient. Whereas, in case the amount of the delustering agent is more than 20.0% by weight based on the photocurable resin composition, the surface-roughening effect is not proportionally increased but the transparency of the photocurable resin composition is rather lowered, thereby causing the ultimate partition walls to exhibit a decreased resolution due to the scattering of light rays. The suitable amount of the delustering agent to be added may be determined on the basis of its side surface roughening effect for the ultimate partition walls. For example, it is preferred that the delustering agent be added to the photocurable resin composition in an amount such that the reflectance as measured according to the method described in Japanese Patent Application Laid-Open Specification No. 57-189439/1982 (corresponding to U.S. Pat. No. 4,506,953) becomes 20% or less. Of the above-mentioned delustering agents, a finely divided silica is most preferred from the standpoint of good dispersion, good refractive index and the like.

Examples of light transmissible substrates to be used in the present invention include a plate made of a transparent glass or plastics such as polymethyl methacrylate, polystyrene, polyvinyl chloride, polycarbonate, polypropylene, polyethylene terephthalate, acetylcellulose, polyvinylidene chloride, a copolymer of ethylene and vinylacetate, polyamide, polyvinyl alcohol, poly-4-methylpentene and the like. The thickness of the light transmissible substrate to be used in the present invention is generally from 1 to 10 mm. However, when a film or sheet of the above-mentioned plastics is used as the light transmissible substrate, the thickness may be from 20 μm to 10 mm, preferably from 50 μm to 10 mm.

Of the above-mentioned plastics, polymethyl methacrylate, polycarbonate and polyethylene terephthalate are preferable from the viewpoint of ease in handling and the like.

Figure 4:
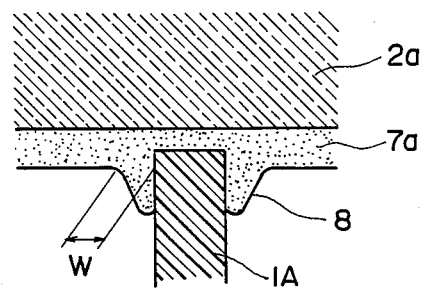
FIG. 4 is a partly cut-away enlarged view of FIG. 3, showing the structure of a fillet formed at the corner portion defined by the inner wall of each aperture of the light shielding screen and the inner surface of each light transmissible substrate.

A photocurable adhesive is applied to one surface of a light transmissible substrate. As described before, the light transmissible substrate having its one surface coated with a photocurable adhesive is placed on a light shielding screen in such a manner that the end surfaces of the partition walls of the light shielding screen are contacted with the photocurable adhesive-coated surface of the light transmissible substrate. When the substrate and screen are pressed against each other for bonding, a portion of the adhesive is caused to protrude into the apertures between the partition walls of the light shielding screen to form a protrusion known as a fillet, whether large or small. In the light shielding screen structure of the present invention, the width of the fillet, as indicated by "W" in FIG. 4, is 5 μm or less. If the width of the fillet is greater than 5 μm, when a light shielding screen structure is actually used on various indicating devices, the transmitted light is scattered, thereby causing the viewable angle and the haze to increase and thus the functions required for a light shielding screen structure cannot satisfactorily be exhibited. On the other hand, if the thickness of the adhesive layer is decreased for minimizing the width of the fillet, the mileage is decreased and a satisfactory bond strength cannot be obtained. It is necessary that the light shielding screen structure have a bonding strength between the light shielding screen and the light transmissible substrates such that when subjected to cutting or blanking or when actually used on an indicating device, no peeling occurs. In other words, there is a technical dilemma. However, by connecting each partition wall to each light transmissible substrate through a photocured adhesive layer according to the present invention, a light shielding screen structure having a fillet width as small as 5 μm and having a peeling strength as large as 50 g/cm or more between each partition wall and each light transmissible substrate has been realized.

In the present invention, a peeling strength is measured under the conditions of a peel angle of 180° and a peel rate of 50 mm/min in accordance with JIS K6854.

With respect to the photocurable adhesive to be used in the present invention, it may comprise a polymer which has been three-dimensionally polymerized by ionic addition reaction and has terminal ethylenically unsaturated bonds in the molecule.

The term "ionic addition reaction" as used herein means a reaction in which functional groups are bonded together nucleophilically or electrophilically without causing elimination of low molecular weight compounds. This is a reaction occurring between a functional group having a active hydrogen atom and another functional group capable of being ionically added by the action of the functional group having an active hydrogen atom. Examples of such reactions include urethanization reaction and epoxy ring-opening reaction.

Polymers having terminal ethylenically unsaturated bonds and which has been three-dimensionally polymerized by repetition of ionic addition reaction can be obtained, for example, by reacting the following 3 types of compounds in the presence or in the absence of a catalyst:

(A) a compound having a plurality of functional groups having an active hydrogen atom;

(B) a compound having a plurality of functional groups capable of being ionically added by the action of functional groups having an active hydrogen atom; and (C) a compound having at least one functional group capable of participating in ionic addition reaction and having a terminal ethylenically unsaturated bond.

Examples of compounds (A) include a polyol, a polythiol and a polyamine. Examples of compounds (B) include an organic polyvalent isocyanate, an organic polyvalent isothiocyanate and a polyvalent epoxy compounds. Compound (C) has a terminal ethylenically unsaturated bond of formula $CH_2=C<$ and also has at least one functional group capable of participating in ionic addition reaction in the molecule, that is, compound (C) has in the molecule at least one group having a terminal ethylenically unsaturated bond, such as a acryloyl group, a methacryloyl group, an allyl group, a vinyloxy group (CH₂=CH—O—) and at least one functional group capable of participating in ionic addition reaction, such as a hydroxyl group, an amino group, a thiol group, an isocyanate group, an isothiocyanate group and an epoxy group. Examples of compounds (C include mono- or di- acrylate of trimethylolpropane, mono- or di- methacrylate of trimethylolpropane, mono-, di or tri acrylate of pentaerythritol, mono-, di or tri- methacrylate of pentaerythritol, mono(meth)acrylate of diols represented by the formula:

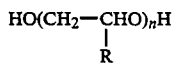

wherein R is hydrogen or an alkyl group having 1 to 4 carbon atoms and n is an integer of from 1 to 1000, (meth)acrylate of 2-hydroxyethylamine, N-aminoethyl acrylate and N-aminohexyl acrylamide. Moreover, substantially all of compounds having in the molecule at least one functional group capable of participating in ionic addition reaction and at least one terminal ethylenically unsaturated group, can be employed as compound (C).

In the preparation of a photocurable adhesive to be used in the present invention, one or more compounds may be used with respect to each of (A), (B) and (C). In this connection, it should be noted that since it is important for the adhesive polymer to have been three-dimensionally polymerized, it is necessary that at least one compound to be reacted for the preparation of a photocurable adhesive have at least three functional groups capable of participating in ionic addition reaction. The ratio of the total of functional groups having an active hydrogen atom to the total of functional groups capable of being ionically added by the action of the functional groups having an active hydrogen atom is chosen within the range of from 0.5 to 2. The closer the ratio is to 1, not only the greater the molecular weight of the resultant three-dimensionally polymerized polymer, but also the more excellent the bonding properties of the resultant polymer.

Further it is necessary that the compound having at least three functional groups capable of participating in ionic addition reaction be used in an amount of 5 mol % or more, preferably 30 mol % or more based on the total of the compounds (A), (B) and (C). If the amount is less than 5 mol%, a satisfactory three-dimensionally polymerized polymer cannot be obtained.

If desired, part of compound (A) or (B) may be substituted with a compound having only one functional group capable of participating in ionic addition reaction. However, such partial substitution is preferably 20% or less.

The polymer which has been three-dimensionally polymerized by ionic addition reaction and having terminal ethylenically unsaturated bonds can be obtained by subjecting a mixture of compound (A), (B) and (C) to aging, e.g., at a temperature of about 30 to about 80° C. for 1 to 3 weeks. Compound (C) having at least one functional group capable of participating in ionic addition reaction and having a terminal ethylenically unsaturated bond is employed for introducing a terminal ethylenically unsaturated bond into the molecule of a three-dimensionally polymerized polymer obtained by ionic addition reaction. The amount of compound (C) is generally 0.1 mol% or more, preferably 2 mol% or more, based on the total of compounds (A), (B) and (C).

The above-mentioned mixture of compounds (A), (B) and (C) is applied to the light-transmissible substrate in such a manner that the thickness of the ultimate adhesive layer becomes 0.5 to 100 μm. If the thickness of the adhesive layer is less than 0.5 μm, the bonding strength becomes not sufficient, while if the thickness is more than 100 μm, the ultimate light shielding screen structure exhibits scattering of transmitted light and low light transmission. The thickness of the adhesive layer is preferably 1 to 50 μm from the practical viewpoint.

In the adhesive to be used in the present invention, 0.1 to 10 wt% of photopolymerization initiators as commonly used may be incorporated. Representative examples of photopolymerization initiators include benzoin, benzoin alkyl ethers such as benzoin ethyl ether, benzoin n-propyl ether, benzoin isopropyl ether and benzoin isobutyl ether, 2,2-dimethoxy-2-phenylacetophenone, benzophenone, benzil, diacetyl, diphenyl sulfide, eosin, thionine, 9,10-anthraquinone, 2-ethyl-9,10-anthraquinone, Michler ketone and the like. They may be used either alone or in combination.

However, although the presence of a photopolymerization initiator in the adhesive improves the bonding strength, the initiator in the adhesive is likely to react with a terminal ethylenically unsaturated bond when the adhesive is exposed to light rays during the preservation or handling, thereby affecting the bonding strength of the adhesive and, hence, proper care must be paid.

Further, in the adhesive to be used in the present invention, 0.01 to 5 wt% of a heat-polymerization inhibitor as commonly used may be incorporated in order to effectively prevent undesirable reactions of a terminal ethylenically unsaturated bond in the polymer during the preservation or the like. Examples of heat-polymerization inhibitors include hydroquinone, tert-butylhydroquinone, benzoquinone, 2,5-diphenyl-p-benzoquinone, picric acid, di-p-fluorophenyl-amine, p-methoxyphenol, 2,6-di-tert-butyl-p-cresol and the like. They may be used either alone or in combination.

In the present invention, for pressing the light transmissible substrate coated with the photocurable adhesive against the partition walls of the light shielding screen, a laminator may be employed. In order to attain uniform lamination, it is preferred to raise the temperature of the rolls of the laminator to about 40° C. to about 100° C. Thus, a laminate of the light shielding screen and the light transmissible substrate coated with the adhesive is obtained. The laminate is exposed to active rays from a source such as an arc lamp, a mercury lamp, a xenon lamp, an ultraviolet fluorescent lamp or the like, to cure the photocurable adhesive, thereby bonding the end surfaces of the partition walls of the light shielding screen to the light transmissible substrate. Active rays are irradiated from the side of the light transmissible substrate to facilitate curing of the photocurable adhesive.

As stated before, in the present invention, the bonding of the partition walls of the light shielding screen with the light transmissible substrate is believed to be performed in accordance with such a mechanism that not only the adhesive force of an adhesive per se serves to cause bonding but also a chemical bonding between the photocurable resin composition remaining less cured in the end surfaces of the partition walls of the light shielding screen and the photocurable adhesive is caused to occur. Therefore, adhesion between the end surfaces of the partition walls and the light transmissible substrate is performed by applying a photocurable adhesive in a small thickness to one surface of the light transmissible substrate and pressing the end surfaces of the partition walls against the adhesive-applied surface of the light transmissible substrate. The application of the photocurable adhesive is conducted by coating the surface of the light transmissible substrate with a mixture of adhesive components and allowing the coated mixture to stand at about 30° C. to about 80° C. (aging) so that the reaction between adhesive components occur to form a thin, less fluid polymer which is three-dimensionally polymerized by ionic addition reaction and has terminal ethylenically unsaturated groups. Accordingly, after the adhesion, the light shielding screen structure is excellent in that it has a fillet extremely reduced in size, while maintaining excellent the bonding strength between the light transmissible substrate and the light shielding screen.

Thus, the light shielding screen structure of the present invention experiences no peeling even when subjected to cutting or blanking to be used for various applications. Further, since the size of the fillet is extremely reduced, the present light shielding screen structure is excellent in optical properties required for a light shielding screen structure such as light shielding properties, light transmission and the like. That is, according to the present invention, a light shielding screen structure having not only excellent mechanical properties but also excellent optical properties required for various indicators for switches and image-indicating devices, is provided.

The light shielding screen structure of the present invention may advantageously be attached to various displays and meters used in an automobile and on image-indicating devices such as the CRT of a television receiver, for controlling the angle of light transmitted from these devices and preventing a lowering of the clarity of the image indicated by these devices, which lowering occurs due to the reflection of extraneous light rays incident on these devices.

DETAILED DESCRIPTION OF PREFERRED EMBODIMENTS

The present invention will now be described in more detail with reference to the following Examples and Comparative Examples, which should not be construed as limiting the scope of the present invention. Parts are by weight, unless otherwise specified.

EXAMPLE 1

100 parts of an unsaturated polyester resin prepared by condensation polymerization of a mixture of propylene glycol, diethylene glycol, adipic acid, fumaric acid and isophthalic acid at a molar ratio of 0.08/0.34/0.28/0.14/0.16, 12 parts of 2-hydroxyethyl methacrylate, 6 parts of diacetone acrylamide, 12 parts of diethylene glycol dimethacrylate, 30 parts of tetramethylene glycol dimethacrylate, 4 parts of benzoin isobutyl ether and 0.05 part of 2,6-di-t-butyl cresol were mixed to obtain a photocurable resin composition. To this photocurable resin composition was added 5 parts of a finely divided silica as a delustering agent to obtain a photocurable resin composition containing a delustering agent.

Then, 90.7 parts of a two-pack type urethane adhesive [comprising ADCOTE AD-335A and CAT-10 (curing agent) manufactured and sold by TOYO MORTON CO., LTD., Japan], 4 parts of polypropylene glycol monomethacrylate, 5 parts of 2,2-dimethoxy-2-phenylacetophenone and 0.3 part of 2,6-di-t-butyl cresol were dissolved in methyl ethyl ketone so that the solid content became 18 wt%, to obtain a photocurable adhesive composition. The photocurable adhesive composition was applied onto a 175 $\mu$m-thick polyethylene terephthalate film using a knife coater and was heat-dried at 80° C. for 60 seconds. A 20 $\mu$m-thick polypropylene film was laminated on the adhesive layer formed on the polyethylene terephthalate film. The thus obtained laminate was subjected to aging at 40° C. for 1 week, thereby to advance and complete the urethanization reaction of the adhesive composition. Thus, a light transmissible substrate (polyethylene terephthalate film) having a 5 $\mu$m-thick photocurable adhesive layer thereon was obtained.

Separately, on a 10 mm-thick transparent glass plate were placed a negative film bearing a negative image of a honeycomb pattern having 30 $\mu$m-wide transparent portions and regular hexagonal opaque portions of 150 $\mu$m in side length. On the negative film was placed a 22 $\mu$m-thick polypropylene film. The above-obtained photocurable resin composition containing a delustering agent was applied onto the polypropylene film in a thickness of 150 $\mu$m using a doctor knife.

The polypropylene film was stripped off from the above-obtained light transmissible substrate having the photocurable adhesive layer. On the photocurable resin layer was laminated the light transmissible substrate having on one surface the photocurable adhesive layer, using a rubber roll in such a manner that the photocurable resin composition layer was contacted with the photocurable adhesive layer formed on the light transmissible substrate.

The resulting laminate assembly was exposed for 20 seconds from the side of the negative film to parallel active rays from a 2 KW mercury short arc lamp placed at a distance of about 250 cm from the film, thereby causing the photocurable resin composition to be photocured in a honeycomb pattern. In this instance, the photocurable adhesive layer formed on the light transmissible substrate was also photocured simultaneously. Thereafter, the glass plate supporting the negative film, the negative film and the polypropylene film were stripped off. Over the photocured resin layer of the resulting assembly was sprayed a weakly alkaline solution (a 1% aqueous solution of sodium borate) heated to 40° C. to remove the non-exposed, non-photocured areas of the resin layer, thereby developing the partition walls. The resultant photorelief plate was rinsed with water and dried, and immersed in a 45° C. hot bath containing 1% by weight of a disperse dye (Kayakalan Blue Black RL, produced and sold by Nippon Kayaku Co., Ltd., Japan) for 30 min to dye the photorelief. Further, the dyed photorelief plate was rinsed with water and dried to obtain a light shielding screen having a support.

Separately, another light transmissible substrate having an adhesive layer covered with polypropylene film was obtained in the same manner as described above including drying and aging of the adhesive composition layer. The polypropylene film was stripped off and the resultant light transmissible substrate having a photocurable adhesive layer was laminated on the above-obtained light shielding screen having the light transmissible substrate as a support, using a laminator (Model AL-70 manufactured and sold by Asahi Chemical Industry Co., Ltd., Japan) in such a manner that the light shielding screen was contacted with the photocurable adhesive layer of the light transmissible substrate. The resultant laminate assembly was exposed for 2 min from the side of light transmissible substrate [2b of FIG. 5(g)] to active rays from 4 KW ultra-high pressure mercury lamp placed at a distance of about 40 cm from the assembly, thereby photocuring the photocurable adhesive layer [7b of FIG. 5(g)]. Thus a light shielding screen structure was obtained. The fillet of the light shielding screen structure caused by the adhesive [7b of FIG. 5(g)] was 2 $\mu$m in width and the peeling strength at the connection between the light shielding screen and each light transmissible substrate was 150 g/cm.

The above-obtained light shielding screen structure was printed with an image on the surface of one light transmissible substrate, and then subjected to press-cutting using a metal die so that it fitted the shape of an indicator for a switch in an automobile. In cutting, there was caused no peeling of the light transmissible substrates from the light shielding screen. When the press-cut light shielding screen structure was attached to the indicator for a switch in an automobile, no problem was caused such as scattering of transmitted light and deterioration of light transmission, satisfying the requirements with respect to the functions of a light shielding screen structure.

EXAMPLE 2

A light shielding screen structure was prepared in substantially the same manner as in Example 1 except that use was made of a photocurable resin composition having incorporated therein a disperse dye (Kayakalan Blue Black RL, produced and sold by Nippon Kayaku Co., Ltd., Japan) in an amount of 0.4 parts relative to 100 parts of the photocurable resin composition, that exposure time for obtaining a light shielding screen having a light transmissible substrate as a support was changed to 60 seconds and that after the steps of development, rinsing and drying, further post exposure was conducted for 1 min by using a 4 KW ultra-high pressure mercury lamp. With respect to the thus obtained light shielding screen structure, the width of the fillet caused by the adhesive was 1 $\mu$m and the peeling strength was 103 g/cm. The light shielding screen structure was printed with an image on the surface of one transmissible substrate, and then press-cut using a metal die so as to conform to the shape of an indicator for a switch in an automobile. In cutting, there was caused no peeling of the light shielding screen. When the press-cut light shielding screen structure was attached to the indicator for a switch in an automobile, no problem was caused such as scattering of transmitted light and deterioration of light transmission.

EXAMPLE 3

200 Parts of polyethylene adipate (diol, number average molecular weight: 2000), 100 parts of a copolymer of ethylene oxide and propylene oxide (block copolymer diol having an ethylene oxide content of 35 wt% and number average molecular weight of 2000), 35 parts of tolylenediisocyanate and 0.5 part of dibutyl laurate were reacted for 2 hours at 70° C., thereby obtaining a block copolymer having an isocyanate group at both terminals of the molecule. To 300 parts of the above-obtained polymer were added 25 parts of 2-hydroxyethyl methacrylate and 0.1 part of hydroquinone and then reacted at 70° C. for 2 hours, thereby obtaining a polymer. 300 Parts of the thus obtained polymer was mixed with 75 parts of 2-hydroxypropyl methacrylate, 15 parts of 2-ethylhexyl acrylate, 30 parts of n-butylacrylate and 6 parts of benzoin ethyl ether, thereby to obtain a photocurable resin composition.

A light shielding screen structure was obtained in substantially the same manner as in Example 1 except that the above-obtained photocurable resin composition was employed in place of the photocurable resin composition as obtained in Example 1 and that 300 $\mu$m-thick polycarbonate films were employed as light transmissible substrates in place of the 175 $\mu$m-thick polyethylene terephthalate films. The light shielding screen structure had a fillet of less than 2 $\mu$m in width and a peeling strength of 75 g/cm. When the light shielding screen structure was press-cut using a metal die, no peeling occurred.

EXAMPLE 4

Substantially the same procedures conducted for pattern forming exposure as in Example 3 were repeated except that formation of an adhesive layer on a polyethylene terephthalate film was omitted. Thereafter, the glass plate placed on the negative film, the negative film, the polypropylene film, the polyethylene terephthalate film were strippted off and then the non-exposed areas of the resin layer were removed, thereby obtaining a light shielding screen having no support. Then, a light transmissible substrate made of polyethylene terephthalate was attached to each surface of the light shielding screen by means of a photocurable adhesive and then exposed to active rays in the same manner as in Example 3, thereby obtaining a light shielding screen structure. The light shielding screen structure had a fillet of 2 $\mu$m in width and a peeling strength of 83 g/cm. When the light shielding screen structure was press-cut using a metal die, no peeling occurred.

COMPARATIVE EXAMPLE 1

A two-pack type urethane non-photocurable adhesive composition [comprising ADCOTE AD-335A and CAT-10 (curing agent) manufactured and sold by TOYO MORTON CO., LTD., Japan] was diluted in methyl ethyl ketone so that the solid content became 18 w%. The thus obtained non-photocurable adhesive was coated on a 175 $\mu$m-thick polyethylene terephthalate film and then dried at 80° C. for 60 seconds, thereby obtaining a light transmissible substrate having a non-photocurable adhesive layer of 5 $\mu$m in thickness. Separately, a light shielding screen having a support was prepared in the same manner as in Example 2. When the above-obtained light shielding screen having a support and the above-obtained light transmissible substrate having an adhesive layer were laminated in such a manner that the side of the light shielding screen remote from the support was contacted with the adhesive layer. The laminate assembly was exposed to active rays in the same manner as in Example 2. Although the width of the fillet formed was not greater than 5 $\mu$m, no bonding was obtained between the light shielding screen having a support and the light transmissible substrate.

COMPARATIVE EXAMPLE 2

A light shielding screen structure was prepared in substantially the same manner as in Comparative Example 1, except that the thickness of the adhesive layer was 50 $\mu$m instead of 5 $\mu$m. In the light shielding screen structure thus obtained, the fillet formed by the adhesive resin had a width of 15 μm and the connection between each partition wall and each light transmissible substrate had a peeling strength of 30 g/cm.

The light shielding properties of this light shielding screen structure was unsatisfactory. That is, the light shielding screen structure had a haze of about 80% due to a decrease in the light transmission and to scattering of transmitted light, and had an increased viewable angle. Further, when the structure was subjected to press cutting, peeling of partition walls from each light transmissible substrate occurred, indicating that the connection between the partition walls and each light transmissible substrate was insufficient.

EXAMPLE 5

A polyester resin having OH groups at both terminals was prepared from 1 mol of trimethylol propane, 1 mole of adipic acid, 2 moles of isophthalic acid and 3 moles of neopentyl glycol. The polyester resin was reacted with 3 moles of epichlorohydrin to obtain an epoxy resin. To 250 parts of 20% solution of the epoxy resin in methyl ethyl ketone were added 6 parts of hexamethylenediamine and 6.3 parts of aminoethyl methacrylate and the resultant solution was homogeneously mixed to obtain an adhesive resin composition. One surface of a polyethylene terephthalate film having a thickness of 175 μm was coated with the adhesive resin composition and the resultant adhesive layer was subjected to drying at 80° C. Then, the surface of the polyethylene terephthalate film having the adhesive layer thereon was laminated on a polypropylene film having a thickness of 20 μm. The obtained laminated material was subjected to aging at 50° C. for 2 weeks to complete the reaction between the epoxy groups and the amino groups, thereby obtaining a light transmissible substrate having on one surface thereof an adhesive layer of 5 μm in thickness.

In substantially the same manner as in Example 1, the thus obtained light transmissible substrate was bonded to the light shielding screen having at its one side a light transmissible substrate, which screen had been prepared in Example 1, to thereby obtain a light shielding screen structure. In the thus obtained light shielding screen structure, the fillet formed by the adhesive had a width of 2 μm and the connection between each partition wall and each light transmissible substrate had a peeling strength of 120 g/cm. When the structure was subjected to press cutting with a die, no peeling occurred between the partition walls and each substrate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A light shielding screen structure comprising:
a first light transmissible substrate;
a second light transmissible substrate; and
a light shielding screen interposed between said first light transmissible substrate and said second light transmissible substrate,
said light shielding screen comprising a photocured resin composition layer and a plurality of apertures passing through said resin composition layer,
said apertures in said resin composition layer forming a perforated structure of a striped or sectioned pattern, in which said resin composition layer constitutes partition walls defining said apertures,
said apertures having their respective upper and lower openings respectively defined by the upper and lower ends of said partition walls,
the upper and lower end surfaces of said partition walls being connected respectively to said first light transmissible substrate and said second light transmissible substrate through a photocured adhesive layer, with part of the photocured adhesive layer which protrudes outwardly from the areas of the upper and lower end surfaces of said partition walls forming a fillet in each aperture at a corner portion which is defined by the inner wall of each aperture and the inner surface of each light transmissible substrate,
the connection between each partition wall and each light transmissible substrate having a peeling strength of 50 g/cm or more, and
said fillet having a width of not greater than 5 μm.
2. A light shielding screen structure according to claim 1, wherein each partition wall contains a dye or a pigment.
3. A light shielding screen structure according to claim 1, wherein each aperture has a width of from 20 to 500 μm, and each partition wall has a height of from 50 to 1,000 μm, and a thickness of 5 to 500 μm, the ratio of the thickness of each partition wall to the width of each aperture being from 1/1 to 1/10, the ratio of the width of each aperture to the height of each partition wall being from 1/0.5 to 1/5.
4. A light shielding screen structure according to claim 1, wherein said photocured adhesive layer comprises a photocured product of a polymer which has been three-dimensionally polymerized by ionic addition reaction and has terminal ethylenically unsaturated bonds in the molecule.
5. A light shielding screen structure according to claim 4, wherein said polymer is a product produced by polymerizing a compound having a plurality of functional groups having an active hydrogen atom, a compound having a plurality of functional groups capable of being ionically added by the action of functional groups having an active hydrogen atom, and a compound having at least one functional group capable of participating in ionic addition reaction and having a terminal ethylenically unsaturated bond.
6. A process for producing a light shielding screen structure comprising:
(a) providing a light shielding screen comprising a perforated structure comprising a plurality of partition walls and apertures defined by said partition walls, said partition walls being arranged to form the apertures in a striped or sectioned pattern, said light shielding screen being in a composite form in which said light shielding screen is connected at one end surface of each partition wall to a first light transmissible substrate through a photocured adhesive layer or being in a single form;
(b) in the case of the light shielding screen in a single form, pressing a first light transmissible substrate having a photocurable adhesive layer and a second light transmissible substrate having a photocurable adhesive layer respectively against both sides of said light shielding screen to obtain a laminate assembly, or
in the case of the light shielding screen in a composite form, pressing said light shielding screen against a sec- ond light transmissible substrate having a photocurable adhesive layer on its side of the photocurable adhesive layer to obtain a laminate assembly; and (c) exposing the laminate assembly to active rays to cure the photocurable adhesive layer, thereby providing a connection between each partition wall and each light transmissible substrate having a peeling strength of 50 g/cm or more and providing a fillet having a width of 5 μm or less, said fillet being defined as part of the photocured adhesive layer which protrudes outwardly from the areas of the upper and lower end surfaces of said partition walls in each aperture at a corner portion defined by the inner wall of each aperture and the inner surface of each light transmissible substrate.

7. A process for producing a light shielding screen structure according to claim 6, wherein said photocurable resin composition contains a dye or a pigment, or said photocurable resin composition contains no pigment or dye and said partition walls are dyed subsequent to step (c).

8. A process for producing a light shielding screen structure according to claim 6, wherein each aperture has a width of from 20 to 500 μm, and each partition wall has a height of from 50 to 1,000 μm, and a thickness of 5 to 500 μm, the ratio of the thickness of each partition wall to the width of each aperture being from 1/1 to 1/10, the ratio of the width of each aperture to the height of each partition wall being from 1/0.5 to 1/5.

9. A process for producing a light shielding screen structure according to claim 6, wherein said photocurable adhesive layer comprises a polymer which has been three-dimensionally polymerized by ionic addition reaction and has terminal ethylenically unsaturated bonds in the molecule.

10. A process for producing a light shielding screen structure according to claim 8, wherein said polymer is a product produced by polymerizing a compound having a plurality of functional groups having a active hydrogen atom, a compound having a plurality of functional groups capable of being ionically added by the action of functional groups having an active hydrogen atom, and a compound having at least one functional group capable of participating in ionic addition reaction and having a terminal ethylenically unsaturated bond.

* * * * *